Feb. 13, 1962 J. SCHMIDT 3,020,825
CANNING RETORT WITH END-OVER-END AGITATION
Filed July 10, 1959 5 Sheets-Sheet 1

Fig. 1

INVENTOR.
JOHN SCHMIDT
BY
Norman Gerlach
ATTY.

Feb. 13, 1962 J. SCHMIDT 3,020,825
CANNING RETORT WITH END-OVER-END AGITATION
Filed July 10, 1959 5 Sheets-Sheet 2

INVENTOR.
JOHN SCHMIDT
BY
ATTY.

United States Patent Office 3,020,825
Patented Feb. 13, 1962

3,020,825
CANNING RETORT WITH END-OVER-END
AGITATION
John Schmidt, 322 Greenwood Ave., Jenkintown, Pa.
Filed July 10, 1959, Ser. No. 826,248
5 Claims. (Cl. 99—362)

The improved canning retort comprising the present invention has been designed for use primarily as a cooker for the heat processing of food products which have been packed in cylindrical containers commonly known as cans. The invention is, however, capable of other uses, and apparatus constructed in accordance with the principles of the present invention may, if desired, with or without modification, be employed for can sterilization, can cleaning, can cooling or other can treating operations. Irrespective, however, of the particular use to which the present apparatus may be put, the essential features of the invention are at all times preserved.

In the commercial processing of food products in cans, it is the usual practice to subject the containers to a fluid heating medium, such as stem, whereby to sterilize and cook the contents thereof. Uniform and proper processing of the can contents requires that there be no localized overheating of the can contents but that the entire food product mass in each container be brought to a specific temperature and that that temperature be maintained effective for a predetermined length of time. However, according to early canning methods which still are to a certain extent practiced today, during the time that is required for heat penetration to the central regions of a cylindrical container or can, the contents of the can in the vicinity of the cylindrical can walls are subject to overheating and consequent food softening, burning or other deterioration. To overcome this limitation, more recent canning practice affords a method whereby the entire contents of each container may be brought to a uniform temperature rapidly and uniformly, with similar rapid and uniform cooling of the entire contents of the containers, thus quickening the entire processing operation. Not only is the achievement of higher quality food products attained, but additionally, processing time is materially shortened while at the same time the amount of container-handling equipment required is appreciably reduced.

The achievement of these results has been made possible, to a large extent, by the development of the so-called "end-over-end" agitation process embodied in a machine or cooker wherein the cylindrical containers or cans are revolved in end-over-end fashion about a horizontal or nearly horizontal axis and within a fluid heating medium such as steam. The principle of operation of this process resides in the fact that the headspace air or other gaseous or vapor bubble in each container is floated across the medial regions of the container and thus through the container contents at such medial regions, thereby effecting internal agitation of the container contents and substantially increasing the rate of heat dissipation throughout the entire contents of the container. By such a process, a materially more rapid heating and cooling of the can contents is attained with a consequent shortening of the processing time required for any given batch. The present invention embodies the process briefly outlined above, and for a more detailed description of the nature and operation of such process, reference may be had to the United States Clifcorn Patent No. 2,517,-542, granted on August 8, 1950, and entitled "Method of Heating Food Products in Sealed Containers."

While the Clifcorn patented process, insofar as actual quality improvement of the food product within the sealed containers, has proven highly satisfactory, the design of can-handling machinery, i.e., canning cookers, for practicing this method has presented numerous problems and has heretofore been beset with various limitations. Principal among these limitations is the high cost of cookers embodying the end-over-end principle. Another serious limitation that is attendant upon present-day cookers of the end-over-end type is the difficulty of loading the packed cans into the apparatus prior to commencement of cooking operations and the unloading of the cans from the apparatus after cooking operations have been completed. Another limitation in connection with cookers of the end-over-end type resides in the undue volume of the heat-processing area requiring large amounts of steam and water and a consequently long period of draining time. Other limitations which will be discussed presently in more detail are the possibility of can interference and consequent can damage during actual can processing, as well as during initial can loading and subsequent can unloading operations; the tendency for reel drift during loading and unloading operations in cookers of the type employing can handling reels; and the occurrence of can floating when the contents of the cans are of less specific gravity than that of the treatment fluid within the cooker.

The present invention is designed to overcome the above-noted limitations that are attendant upon the present-day construction and use of cookers, sterilizers and the like which embody the end-over-end principle of food product agitation within the packed containers undergoing treatment, and, accordingly, the provision of a cooker or similar apparatus of improved design which will so obviate the difficulties encountered constitutes the principal object of the invention.

Specifically, it is an object of the present invention to provide a cooker or similar apparatus of the end-over-end type and embodying a rotatable can supporting drum or reel having associated therewith novel means for retaining the various cans in operative position within the reel during processing operations in such a manner as to protect the cans against can interference, either one with another, or by contact with a stationary part of the cooker, and for automatically releasing the cans for removal purposes when a series of such cans is brought into register with a can discharge opening in the end wall of the cooker and at such times as a discharge door or gate in the vicinity of such discharge opening is opened for such removal operations.

Another and important object of the invention, in an end-over-end cooker of this character, is to provide a means for positively locking the can supporting reel in various fixed positions during both loading and unloading operations so that the presence or absence of cans on one side or the other of the horizontally disposed reel will not by an inherent condition of unbalance cause undesired reel drift and consequent can misalignment with the can discharge opening in the cooker end wall.

Yet another object of the invention is to provide an end-over-end cooker having means associated therewith whereby the can supported reel associated therewith may be continuously rotated about its axis for actual heat processing operations, or alternatively, intermittently rotated or indexed so that the various series or rows of cans supported by the reel may selectively be brought into operative register with the filling and discharge openings provided in the cooker end walls respectively.

A still further object of the invention is to provide a canning cooker assembly of the type which embodies end-over-end product agitation as briefly outlined, above, the assembly including an outer cylindrical shell or retort and an inner rotatable can supporting drum or reel, the reel body being cylindrical and of hollow imperforate construction so that the processing fluid, whether it be a heating or a cooling media, is excluded from the interior of the body. By such an arrangement, an annulus is created between the reel body and the shell wall, this annulus, together with the spaces existing in the end regions of the cooker assembly between the reel body and retort end walls, constituting a jacket-like region, the volume of which constitutes the entire available space for the treatment fluid. In this manner, a considerable saving in the amount of treatment fluid required for processing any given batch of containers is effected.

Yet another object of the invention, in a canning cooker of this sort, is to provide a novel form of can supporting reel structure which is adequately reinforced in all directions against stresses and which furthermore receives the cans in circumferentially arranged elongated rows of tangentially arranged cans and presents to these cans but slight tractional resistance to rolling movement of the cans as the same move toward the discharge opening of the cooker.

The provision of a cooker assembly which is extremely compact in its design and which, therefore, requires but little floor space; one which is relatively simple in its construction and which, therefore, may be manufactured at a low cost; one which is comprised of a minimum number of parts, particularly moving parts and which, therefore, is unlikely to get out of order; one which is rugged and durable and which, therefore, will withstand rough usage; one which is simple in its design and which requires no detailed or complicated manipulations in the conduction of the process involved and which, therefore, may be operated by unskilled labor; one which is smooth and silent in its operation; one which is capable of ease of assembly and dismantling for purposes of inspection or replacement of parts; and one which, otherwise, is well adapted to perform the services required of it, are further desirable features which have been borne in mind in the production and development of the present invention.

Numerous other objects and advantages of the invention, not at this time enumerated, will become more readily apparent as the following description ensues.

In the accompanying four sheets of drawings forming a part of this specification, a preferred embodiment of the invention has been shown.

In these drawings.

Figure 1:
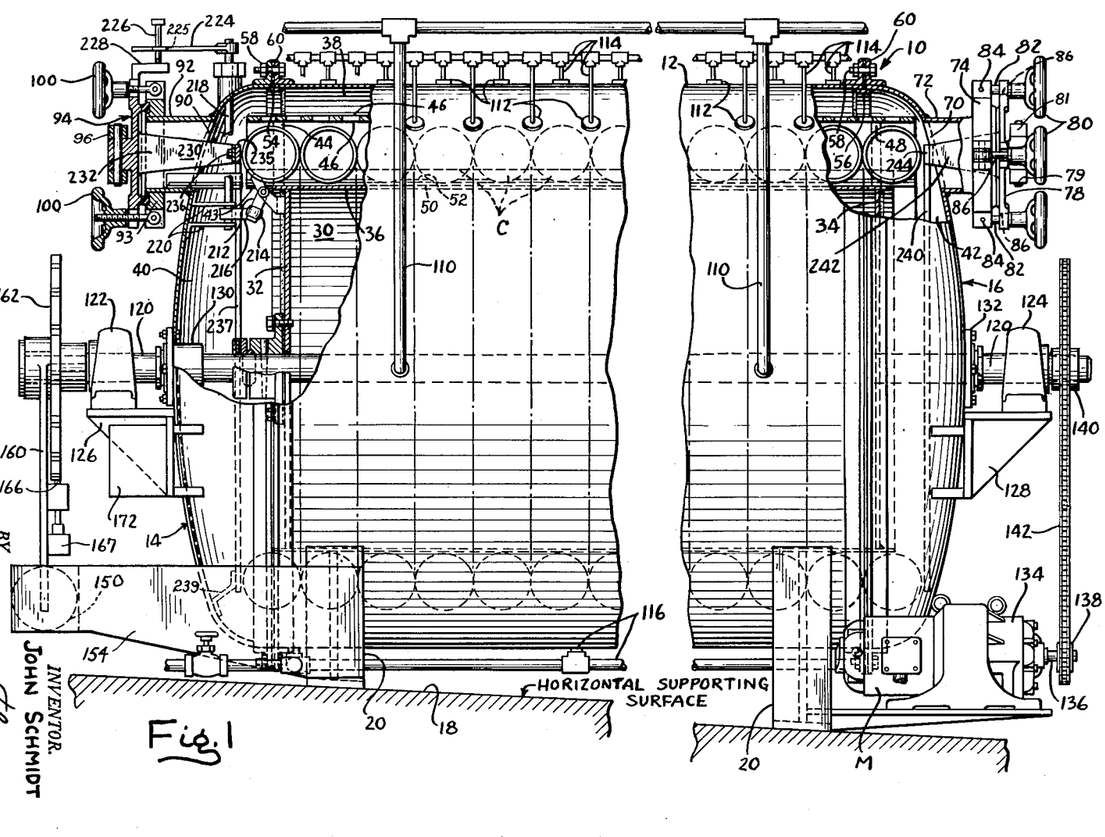
FIG. 1 is a side elevational view of a cooker assembly constructed in accordance with the principles of the present invention, with certain parts being broken away and other parts in section to more clearly reveal the nature of the invention.
Figure 1A:
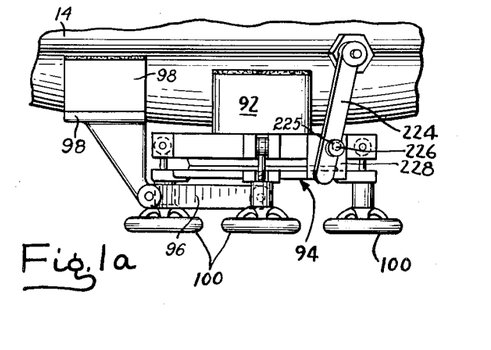
FIG. 1a is an enlarged fragmentary top plan view of a portion of the structure shown in FIG. 1.
Figure 2:
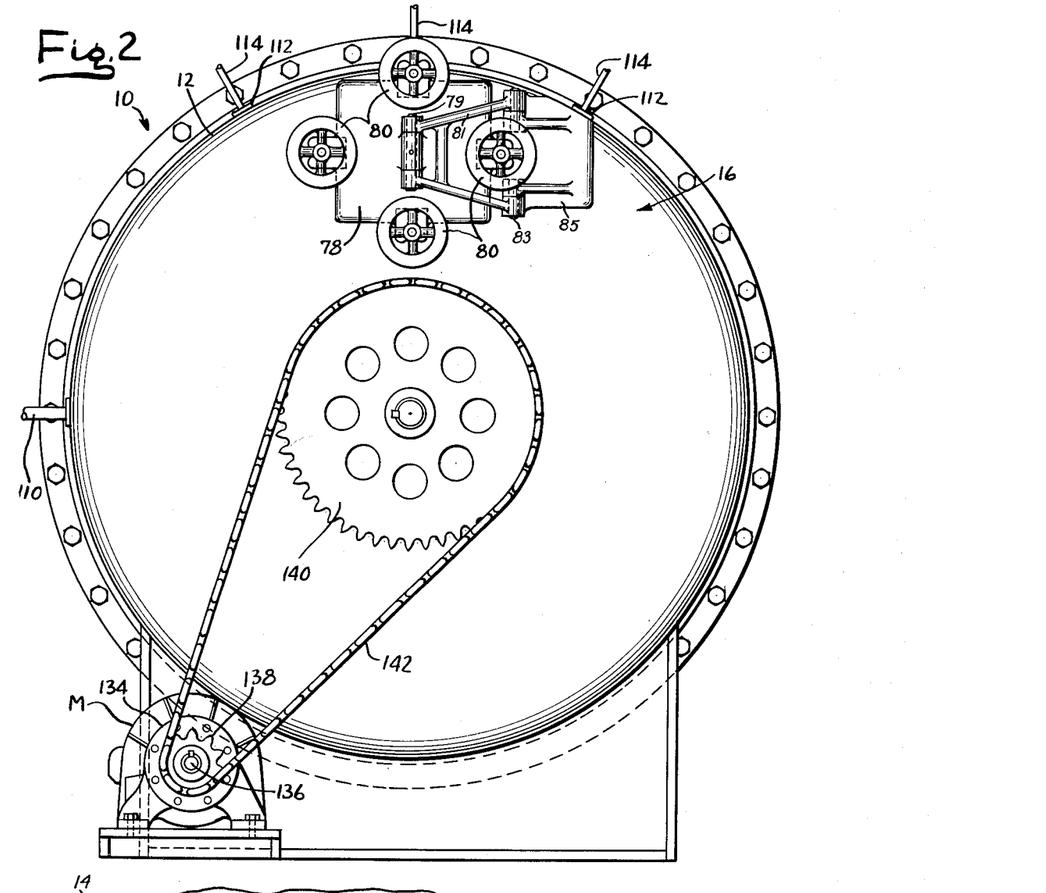
FIG. 2 is a front end elevational view of the structure shown in FIG. 1.
Figure 3:
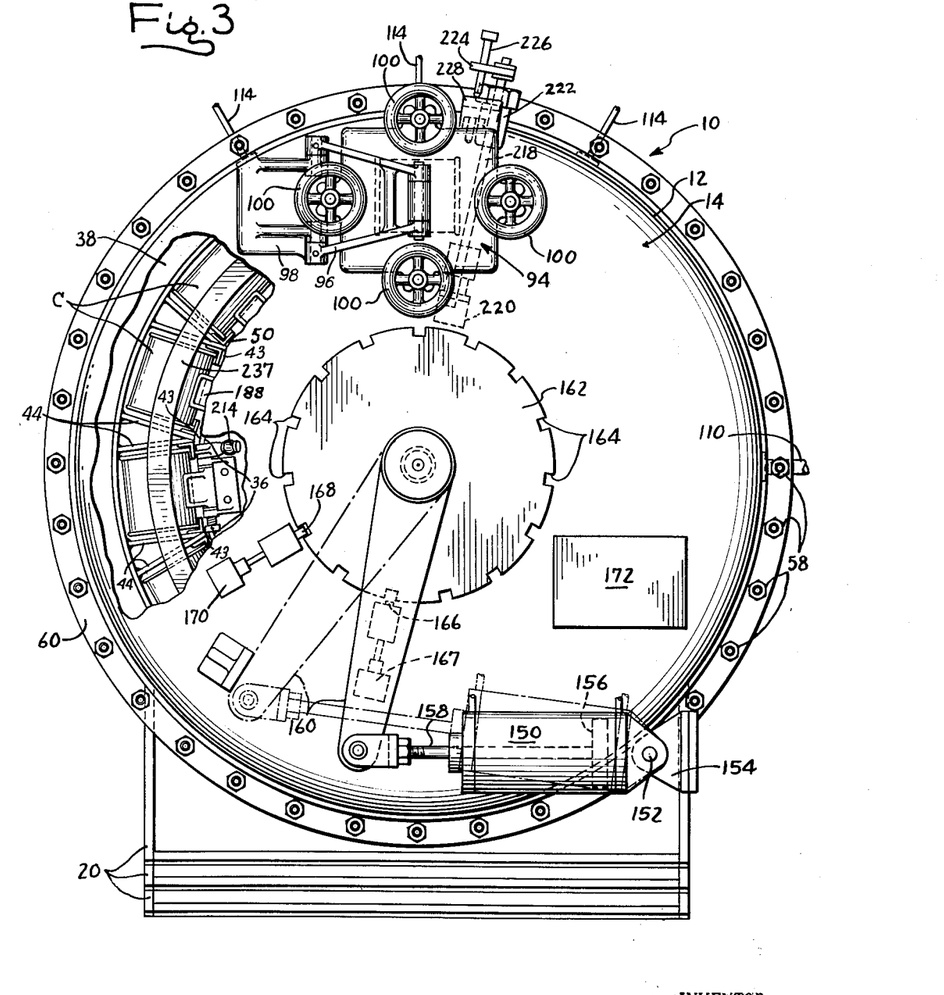
FIG. 3 is a rear end elevational view of the structure shown in FIG. 1.

Referring now to the drawings in detail, and in particular to FIGS. 1 and 3, inclusive, briefly, the processing apparatus of the present invention affords essentially a batch operation for the processing of a large number of cylindrical containers which have been filled with a food product by the application of heat thereto. The apparatus is essentially a sterilizing or pressure cooking machine of the batch type wherein a large number of the filled and sealed containers enclosing a food product are loaded into the machine in a batch, processed by heating them for a predetermined time and then cooling them rapidly while, during the entire processing operation, the contents of the containers are subjected to agitation by end-over-end movement of the same, after which the containers are unloaded from the machine. It will be understood that, according to the previously mentioned patent to Clifcorn, the food product within the containers is of a mobile nature and it is confined in the presence of a gaseous headspace, the containers being in the form of cylindrical metal cans or sealed glass jars. The containers are revolved in end-over-end fashion about an axis which is slightly inclined relative to a horizontal plane for gravity discharge purposes as will be made clear presently, the rate of revolution being an optimum rate whereby the headspace in each container is caused to move in the form of a buoyant bubble through the contents of the container so as to displace the mobile contents of the container in the medial regions thereof and so that portions of the mobile material near the middle of the container are moved outwardly into contact with the container walls for rapid heating or cooling.

In FIG. 1, the retort or housing 10 within which such end-over-end agitation takes place is shown as being in the form of a cylindrical shell 12 which is tightly closed at its opposite ends by means of generally cup-shaped rear and front closure members of heads 14 and 16, respectively. Although in this view the longitudinal axis of the shell 12 appears to extend horizontally while the floor or supporting surface 18 on which the retort 10 is mounted appears to extend on a slight incline, such disclosure is merely a drafting expediency, and in actual practice, the longitudinal axis of the shell extends at a slight incline relative to a horizontal plane in order that gravity discharge of the contents of the retort may take place in a manner that will be made clear presently. The shell 12 is supported in its inclined position by means of suitable legs 20. The closure heads 14 and 16, in combination with the shell 10, provide a pressure-tight treatment chamber internally of the housing.

Centrally disposed within the retort and mounted for continuous rotation therein under the influence of a driving motor M is a container-supporting cylinder, drum or reel 30 which is arranged for rotation about the inclined axis of the shell 10. The reel 30 is of relatively simple construction and consists of structural steel members suitably welded together to form a unitary rigid structure. The reel includes rear and front circular end plates 32 and 34 respectively around which there extends an inner imperforate cylindrical inside wall 36, the wall, together with the end plates 32 and 34, forming a closed cylindrical structure from the interior of which the steam or other processing fluid such as the cooling media are excluded. Thus, the reel body, in combination with the outer shell 12, serves to define therebetween a cylindrical annulus or space 38 which, together with the circular end spaces 40 and 42 at the rear and front of the structure respectively, constitutes, in effect, a reel-encompassing jacket the volume of which constitutes the entire fluid-receiving volume for the cooker as a whole. By the exclusion of fluid from the interior of the cylindrical reel body, a considerable saving in both the heating and cooling fluid media required to process any given batch of containers is attained.

Figures 4, 5:
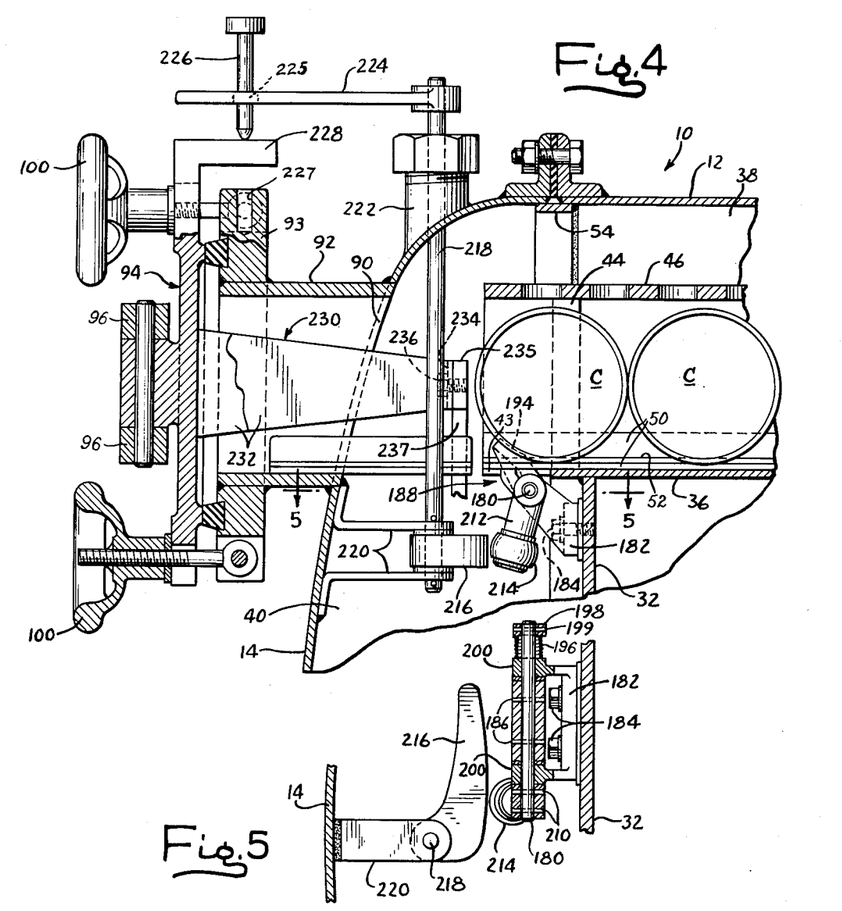
FIG. 4 is an enlarged fragmentary view of a portion of the structure shown in FIG. 1.
FIG. 5 is a sectional view taken substantially along the line 5—5 of FIG. 4.
Figure 6:
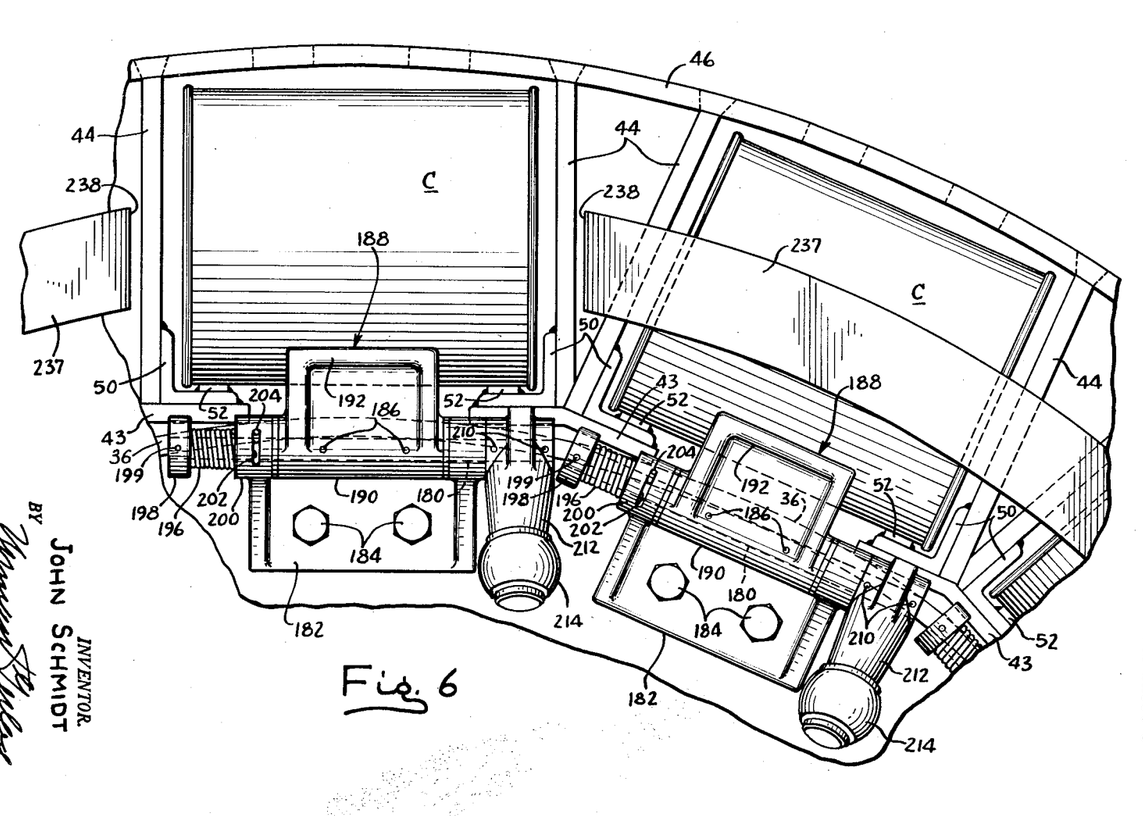
FIG. 6 is an enlarged fragmentary view of a portion of the structure shown in FIG. 3.

Still referring to FIGS. 1 to 3, inclusive, and additionally to FIGS. 4 and 6, the cylindrical wall 36 of the reel body has welded thereto at equally and circumferentially spaced regions a series of longitudinally extending elongated obtuse angle plates 43 which, in turn, have welded thereto the inner ends of a plurality of combined supporting and spacing straps or struts 44 near the rear of the cooker assembly. The struts of each pair have their inner welded ends arranged in contiguity as best seen in FIGS. 3 and 6 while the outer ends of the struts are welded to the inside face of a cylindrical perforate outer reel cage 46. The struts 44 of each pair diverge radially outwardly from each other and the entire series of struts comprise, in effect, a spider-like arrangement of webs by means of which the rear end region of the outer reel cage 46 is supported in spaced concentric relation from the inner cylindrical wall 36 of the reel body. The front end region of the outer reel cage 46 is similarly supported by struts 48 similarly arranged in pairs and welded at their inner ends to the obtuse angle plates 43 on the reel body and at their outer ends to the perforate reel cage 46.

As best seen in FIGS. 4 and 6, the struts 44 and 48 are reinforced at their bases by elongated angle pieces 50 which are welded to both the struts and elongated obtuse angle pieces 43 and which present raised rail portions 52 designed for tractional reception thereon of the end regions of the cylindrical walls of the various cans or other cylindrical containers undergoing processing. The alternate adjacent pairs of angle pieces 43 define therebetween, in effect, a trough or channel between which channel a row of containers such as the containers which have been designated at C may be received and along which channel these containers may roll by gravity toward the discharge end of the cooker during can unloading operations.

It is to be noted at this point that the adjacent struts 44 and 48 of adjacent pairs of struts are disposed in parallelism so that the radially extending sides of the corresponding adjacent angle pieces 50 are likewise parallel. The bases of these angle pieces including the rails 52 are spaced from the inner cylindrical surface of the perforate cage member 46 a distance slightly greater than the diameter of the containers C and thus the containers are incapable of upending within the longitudinally extending guideways defined for them by the angle pieces 50 and cage member 46. Similarly, the circumferential distance between the vertical webs of adjacent opposed angle pieces is slightly greater than the axial extent of the cans C so that the cans are, in effect, confined in circumferentially disposed longitudinally extending generally rectangular guideways within which they remain substantially immobile relative to the rotating reel structure during processing operations and within which they may roll tractionally forwardly toward the front of the reel structure during container loading and unloading operations.

Referring now to FIGS. 1, 2 and 4, at the juncture between both the rear closure head 14 and the front closure head 16 and within the retort shell 12, circular reinforcing bands 54 and 56, respectively, are welded to the inside face of the shell 12 and project forwardly and rearwardly therefrom respectively so as to provide a pilot and seat for the closure heads when the latter are in position on the shell. The closure heads are maintained in position on the shell by means of nut and bolt assemblies 58 which pass through mating clamping flanges 60 welded to the various members.

The rotatable reel 30 is adapted to be loaded by the feeding of the filled containers or cans C through a loading opening 70 provided in the front end closure 16 near the top thereof. A generally horizontal loading chute 72 is formed on the head 16 in register with the loading opening 70 and terminates in a seating flange 74. A rectangular closure door 78 (FIG. 2) has its central regions hinged as at 79 to one end of a swinging arm 81 and the other end of the arm 81 is hinged as at 83 to a fixed bracket 85 mounted on the head 16. The door 78 is thus capable of bodily swinging movements toward and away from the loading opening 70 into and out of closing position respectively. A series of four locking handwheels 80 are threaded on respective studs 82 which are pivoted as at 84 to the flange 74 and the studs 82 are adapted to be received in open-ended radial slots 86 in the periphery of the door 78 whereupon tightening of the handwheels 80 will serve to lock or clamp the door in its closed position against the seating flange 74.

The reel 30 is adapted to be unloaded through a discharge opening 90 (FIG. 1) provided in the closure head 14. The discharge opening is provided with a discharge chute 92 having a flange 93 similar to the flange 74 and, otherwise, the opening 90 is equipped with a door 94 which is similar to the door 78 and which is similarly mounted on a swinging arm 96 carried on a fixed bracket 98 mounted on the head 14. The door is adapted to be clamped in its closed position across the opening 90 by handwheel and stud assemblies 100 substantially identical with the handwheel and stud assemblies 80, 82 previously described in connection with the feed opening 80. The feed opening 70 and discharge opening 90 are disposed in longitudinal alignment so that when one of the can guideways provided in the peripheral regions of the reel assembly 30 is uppermost within the cooker shell 12, the ends of the guidway register with both the feed and discharge doors 70 and 90, respectively. As will be made clear presently, means are provided for intermittently rotating the reel 30 in step-by-step fashion to bring the various guideways for the containers into successive register with the two openings 70 and 90 for both reel loading and reel unloading or discharge operations. Means are also provided for rotating the reel continuously so that the various containers carried thereby will revolve about the axis of the reel in end-over-end fashion for thorough product agitation in the manner and by phenomena previously described.

While the containers are thus being revolved about the reel axis in end-over-end fashion, they are subjected to the processing influence of heat by heat transfer from a suitable heated fluid medium such as steam which is admitted to the interior of the shell 12 through suitable steam lines 110 under moderate pressure. The steam, thus admitted to the interior of the shell 12, may circulate through and around the annulus provided between the outer cylindrical wall 36 of the reel body and the outer shell and it may also circulate through and around the ends of the reel, the steam readily passing through the perforate cage member 46. The containers are thus intimately surrounded by the heated fluid media and they are subjected to the heating influence of this media by direct heat transfer for the requisite length of time to assure proper processing of the product within the containers. After the contents of the containers have been thus heat processed, they may be cooled by the admission of cold water through a series of spray nozzles 112 communicating with water pipes 114. The condensate from the steam as well as the water supplied for cooling purposes may be drained from the system through suitable drain piping 116. The specific manner in which the heating and cooling media are introduced to the interior of the cooker assembly form no part of the present invention and no claim is made herein to any novelty associated with the same, the invention residing rather in the construction of the reel 30, the provision of structure yet to be described for maintaining the containers in their proper relationship during processing operations, and the provision of novel release mechanism for releasing the containers from the reel at such time as they are brought into register with the discharge opening and the discharge door is moved to its open position.

As shown in FIGS. 1 to 3, inclusive, the reel is fixedly mounted on and supported by a horizontally extending reel shaft 120, the ends of the latter being rotatably journalled in anti-friction bearings 122 and 124 carried by the closure heads 14 and 16, respectively, centrally thereof, the bearings being supported by brackets 126 and 128 mounted on the heads. Suitable fluid seals 130 and 132 are provided between the reel shaft and the heads 14 and 16, respectively, where the shaft emerges from the cooker retort 10. Rotation of the shaft 120 continuously for continuous rotary motion of the reel 30 during can processing operations is effected by means of the previously mentioned electric motor M which operates through a gear reduction device 134 (FIG. 1) having an output shaft 136 carrying a sprocket 138. The rear end of the shaft 120 carries a sprocket 140, and a chain 142 passes over both sprockets 138 and 140 and serves drivingly to connect the output shaft 136 of the gear reduction device 134 to the reel driving shaft 120.

Pneumatic means are provided for periodically indexing the reel driving shaft 120 during can loading and unloading operations to successively bring the various can guideways provided in the peripheral regions of the reel 30 by the angle pieces 50 into register with the discharge opening 90. Accordingly, as best seen in FIGS. 1 and 3, a pneumatic cylinder 150 has one end thereof pivoted as at 152 on a bracket 154 so that the cylinder as a whole is swingable in opposite directions about a horizontal axis to a limited degree. The cylinder has associated therewith a piston 156 which is operatively connected by means of a plunger 158 to the distal end of an arm 160, the proximate end of which arm is pivotally mounted on the forward end of the reel drive shaft 120. Also mounted on the forward end of the reel drive shaft and fixedly secured thereto so as to rotate therewith is a notched ratchet wheel 162 having a series of circumferentially spaced notches 164 formed therein. The notches 164 correspond in number and spacing to the number and circumferential spacing of the various can guideways in the peripheral regions of the reel 30. A retractible pawl 166, carried by the arm 160 and operable under the control of a piston and cylinder assembly 167 is designed for successive register with the various slots 164 and is adapted to be pneumatically operated in the usual manner of operation of such pawl drive mechanisms for periodic indexing of the ratchet wheel 162. A holding pawl 168, likewise pneumatically operable under the control of a piston and cylinder assembly 170, serves to maintain the ratchet wheel 162 in the various positions of which it is capable of assuming under the control of the pawl 166 during the loading or unloading operations of each guideway to maintain the latter in register with the feed and discharge openings 70 and 90, respectively. The pneumatic control system whereby the reel 30 may periodically be indexed during loading and unloading operations is purely conventional. The various control devices may be operatively connected to control mechanism (not shown) contained within a control box or panel 172 conveniently mounted on the bracket 126 where it is accessible to the operator of the apparatus.

Referring now to FIGS. 3, 4 and 6, centered radially inwardly of each pair of angle pieces 50 is a rock shaft 180, each rock shaft being rotatably mounted in a bracket 182 anchored as at 184 by screws to the rear end plate 32 of the reel body. Pinned as at 186 to each rock shaft 180 centrally of the latter is a spring-biased gate member 188, the member comprising a central hub 190 from which there extends outwardly a generally square loop or cradle portion 192 having a curved surface 194 shaped conformably to the cylindrical walls of the cans C. A helical coil spring 196 surrounds the rock shaft 180 adjacent one end thereof and has one end thereof anchored in a collar 198 pinned as at 199 to the shaft and has its other end anchored in a boss 200 formed on the bracket 182. The spring thus serves to bias the rock shaft and can gate member 188 in a clockwise direction, as viewed in FIG. 4, so that the gate member 188 is normally projected into the path of movement of the foremost can in the series or row of cans contained in any given can guideway which may be in register with the discharge opening 90 during can unloading operations. The advanced can limiting position of the gate member is determined by means of a slot 202 formed in the boss 200 and in which there projects a pin 204 carried by the rock shaft 180, one end of the slot serving to limit the movement of the pin when the gate member is in its operative advanced position.

As shown in FIGS. 4 to 6, inclusive, each rock shaft has pinned thereto as at 210 an actuating finger 212 carrying at its distal end a roller 214. The roller is designed for engagement with a cam finger 216 carried at the lower end of an elongated rod 218 (see also FIG. 3) rotatably mounted on the upper regions of the rear closure head 14. The rod 218 is rotatably supported at its lower end in brackets 220 affixed to the inside face of the closure head 14 and it is similarly rotatably supported at its upper end in bracket 222 affixed to the outside face of the closure head. The rod 218 projects through the closure head 14 and carries at its extreme upper or outer end an operating handle 224.

The cam finger 216 is thus disposed at the discharge station of the cooker assembly in the vicinity of the discharge opening 90 and it is designed for operative registry with each of the rollers 214 as such roller is moved into position at the discharge station when its respective guideway, which it underlies, is brought into register with the discharge opening 90 for can discharge purposes.

The operating handle 224 is provided with a hole 225 therethrough in which there is vertically slidable a locking pin 226 adapted to be inserted into a socket 227 formed in the flange 93 of the chute 92 on the closure head 14 to afford a reaction latching effect for the thrust of the roller 214 when the handle 224 is turned to its operative roller-engaging position. A flange or ledge 228 formed on the door 94 overlies the socket 227 and underlies the pin 226 when the door is in its closed position over the discharge opening 90 and prevents the pin from seating within the socket 227 so that the cam finger 214 is incapable of restraining the roller 214 at any time other than when the door is in its closed position.

According to the present invention, precautionary means are provided whereby when the discharge door 94 is closed and locked by means of the various handwheel and stud assemblies 100, the row of cans in each of the guideways is positively held against forward shifting movement, regardless of the position of the various gate members 188. In other words, in the event of a failure of one or more of the gate members 188, the various cans C undergoing processing in the cooker will be maintained in their respective positions so that there can be no jamming of the machine. Accordingly, the door 94 has welded thereto on the inside face thereof a rearwardly extending thrust member in the form of a generally U-shaped bracket 230 having generally parallel side arms 232 and a connecting base or web 234 carrying a bridge member or block 235 which is anchored thereto by a bolt 236. A circular can confining segment ring 237 mounted on the closure head 12 interiorly of the shell 12 by means of a bracket 239 (FIG. 1) is concentric with the reel 30 and is disposed forwardly thereof in register with the various can retaining guideways associated with the reel. The segment ring 237 is interrupted in the extreme upper regions thereof as at 238 (FIG. 6) and the void thus created in the segment ring is adapted to be closed by interpositioning therein of the bridge member 235 at such times as the discharge door 94 is in its closed position. At such times as the door 94 is open for can unloading purposes, the bridge member 235 will be withdrawn from its bridging position across the interrupted ends of the segment ring 237 so that the foremost can in the row of cans contained in the guideway in register with the discharge opening 90 may pass outwardly from the guideway and through the opening 90.

A similar structure for retaining the cans in position within their respective guideways during actual can processing operations is associated with the closure head 16 and its closure door 78. This structure includes a segment ring 240 on the front closure head 16 and a bracket 242 carrying a bridge member or block 244 which fills the gap in the segment ring when the closure door 74 is in its closed position. These members 240, 242 and 244 are substantially identical with the members 237, 230 and 235 respectively associated with the front closure door 94 and, therefore, require no detailed description thereof.

The provision of such structure at the feed end of the cooker assembly 10 is particularly desirable during the processing of containers C which are filled with food products having a specific gravity which is less than the specific gravity of the heat transfer media employed for processing the containers. The segment ring 240 and bridge block 244 serve, in such instances, to prevent rearward drift of the container within their respective guideways due to the inherent buoyancy of the containers as a whole. Since the central axis of the reel is inclined forwardly and downwardly relative to a horizontal plane, in the absence of the segment ring 240 and its associated structure, the inherent buoyancy of the containers would tend to cause "floating" of the containers in the heat treatment media of higher specific gravity with a consequent container drift toward the front end of the cooker construction.

From the foregoing detailed description, it is believed that the nature, use and many advantages of the herein described can processing cooker assembly 10 will be readily understood and appreciated. It is apparent that the improved cooker assembly provides a novel and efficient apparatus by means of which the beneficial results of end-over-end can processing as taught by the patent to Clifcorn, mentioned above, may effectively be attained. The present apparatus is marked by extreme simplicity and sturdiness of construction. The ease of loading and unloading operations made possible by the novel arrangement of can tracks which are arranged in spaced circumferential relationship around the periphery of the reel 30 and by the aligned feeding and discharge openings 70 and 90, respectively, which are designed for selective register with the can tracks, and the various precautionary measures for preventing can drift and consequent can damage during processing operations contribute toward the provision of an apparatus which, despite the fact that the total reel content, numerically speaking, may be somewhat less than the reel capacity of other machines designed for the same purpose, is capable of processing containers which are filled with food products at a rate at least as rapid as such other machines and with a materially reduced consumption of treatment fluid, whether such fluid be a heating or a cooling media.

It will be understood that the specific embodiment of a cooker construction for processing containers by end-over-end agitation thereof is intended only as an exemplary structure suitable for commercial practice of the invention. The illustrated embodiment of the invention may be materially modified and the improved structures herein set forth may be displaced by equivalent structures without departing from the spirit of the invention as defined in the appended claims.

Having thus described the invention what I claim as new and desire to secure by Letters Patent is:

1. In an end-over-end cooker for the processing of mobile material confined in cylindrical containers, in combination, a retort adapted to contain a heat-exchange fluid therein, said retort including an elongated substantially cylindrical shell, a closure head for each end of the shell, the axis of the shell being inclined slightly relative to a horizontal plane whereby one end of the shell is slightly elevated with respect to the other end, there being a feed opening for containers in the closure head at the elevated end of the shell, there being a discharge opening in the other closure head said openings being in longitudinal alignment relative to the shell and being disposed in the upper regions of the latter, a substantially cylindrical reel disposed concentrically within said shell and mounted for rotation about the inclined axis of the latter, a plurality of circumferentially spaced elongated container-confining guideways having open ends each adapted to receive a succession of the containers sidewise therein whereby, upon rotation of the reel, the containers will revolve about said inclined axis in end-over-end fashion, the ends of said guideways, upon rotation of the reel, moving successively into receiving and discharge register with said feed and discharge openings respectively, a container-confining segment ring fixedly mounted within the retort and in concentric relation to the reel and positioned adjacent to the closure head at the lower end of the retort for preventing egress of the lowermost container in each guideway, said segment ring being interrupted to provide a gap in the upper regions thereof and in longitudinal register with the discharge opening and permit discharge of containers from the various guideways by gravity through said discharge opening, a door for said discharge opening, hinge means connecting the door and said other closure head whereby the door is movable into and out of sealing register with the opening, and an abutment on said door, said abutment being movable bodily with the door, upon positioning of the door over said discharge opening, into said gap for blocking register with said guideways as the latter assume their uppermost positions relative to the axis of the reel.

2. In an end-over-end cooker for the processing of mobile material confined in cylindrical containers, the combination set forth in claim 1, wherein said abutment on the door comprises a bracket secured to the door, and a block carried by the bracket and adapted to become interposed in said gap in the segment ring to substantially complete the continuity of the latter when said door is operatively positioned in said discharge opening.

3. In an end-over-end cooker for the processing of mobile material confined in cylindrical containers, in combination, a retort adapted to contain a heat exchange fluid therein, said retort including an elongated substantially cylindrical shell, a closure head for each end of the shell, the axis of said shell being inclined slightly with respect to a horizontal plane whereby one end of the shell is slightly elevated with respect to the other end, there being a feed opening for containers in the closure head at the elevated end of the shell, there being a discharge opening in the other closure head, said openings being in longitudinal alignment relative to the shell, a substantially cylindrical reel disposed concentrically within said shell and mounted for rotation about the inclined axis of the latter, a plurality of circumferentially spaced elongated longitudinally extending container-supporting tracks longitudinally coextensive with the reel in the outer regions thereof, means including said tracks defining a series of open-ended guideways for receiving the containers sideways therein whereby, upon rotation of the reel, the containers will revolve about said inclined axis in end-over-end fashion, said guideways, upon rotation of the reel, moving successively into receiving and discharge register with said feed and discharge openings respectively, a door for said discharge opening, hinge means connecting the door and said other closure head whereby the door is movable into and out of sealing register with the opening, a gate member for each guideway, means pivotally connecting said gate member to the reel for movement between an advanced position wherein it is positioned in the path of movement of containers leaving the open end of the guideway for discharge through said discharge opening, and a retracted position wherein it is out of such path of movement, spring means normally urging the gate member to its advanced position, and manually operable means positioned adjacent said discharge opening and capable of successive cooperation with the gate members when their respective guideways are moved into register with the discharge opening for individually moving the gate members to their retracted positions, said manually operable means for moving said gate members comprising a power train extending through said other closure head and having a manually operable element positioned exteriorly of the retort, and means operable when said door for the discharge opening is in its operative position over the latter for rendering said power train inoperative.

4. In an end-over-end cooker for the processing of mobile material confined in cylindrical containers, in combination, a retort adapted to contain a heat exchange fluid therein, said retort including an elongated substantially cylindrical shell, a closure head for each end of the shell, the axis of said shell being inclined slightly with respect to a horizontal plane whereby one end of the shell is slightly elevated with respect to the other end, there being a feed opening for containers in the closure head at the elevated end of the shell, there being a discharge opening in the other closure head, said openings being in longitudinal alignment relative to the shell, a substantially cylindrical reel disposed concentrically within said shell and mounted for rotation about the inclined axis of the latter, a plurality of circumferentially spaced elongated longitudinally extending container-supporting tracks longitudinally coextensive with the reel in the outer regions thereof, means including said tracks defining a series of open-ended guideways for receiving the containers sideways therein whereby, upon rotation of the reel, the containers will revolve about said inclined axis in end-over-end fashion, said guideways, upon rotation of the reel, moving successively into receiving and discharge register with said feed and discharge openings respectively, a door for said discharge opening, hinge means connecting the door and said other closure head whereby the door is movable into and out of sealing register with the opening, a gate member for each guideway, means pivotally connecting said gate member to the reel for movement between an advanced position wherein it is positioned in the path of movement of containers leaving the open end of the guideway for discharge through said discharge opening, and a retracted position wherein it is out of such path of movement, spring means normally urging the finger to its advanced position, and manually operable means positioned adjacent said discharge opening and capable of successive cooperation with the gate members when their respective guideways are moved into register with the discharge opening for individually moving the gate members to their retracted positions, said manually operable means for moving said gate members comprising a rotatable rod projecting through said other closure head, a gate-engaging cam finger on said rod interiorly of the retort and individually engageable with the gate members for moving the same from their advanced positions to their retracted positions against the action of said spring means, an operating handle on said rod exteriorly of the retort, a locking shoulder on said other closure head, and a cooperating locking pin on said handle and engageable with said locking shoulder for maintaining said handle in a predetermined position wherein the manually operable means for moving the gate members is rendered effective.

5. In an end-over-end cooker for processing mobile material confined in cylindrical containers, the combination set forth in claim 4 including, additionally, a latch element on said door and positioned in the path of movement of the locking pin for preventing engagement between the pin and shoulder when said door is in its closed position over the discharge opening.

References Cited in the file of this patent

UNITED STATES PATENTS

| | | |
|---|---|---|
| 1,153,177 | Keast | Sept. 7, 1915 |
| 1,485,851 | Hopper | Mar. 4, 1924 |
| 1,569,601 | Anderson | Jan. 12, 1926 |
| 1,803,994 | Chapman | May 5, 1931 |
| 1,939,372 | Thompson | Dec. 12, 1933 |
| 2,176,811 | Galvin | Oct. 17, 1939 |